(12) United States Patent
Mori et al.

(10) Patent No.: US 12,427,597 B2
(45) Date of Patent: Sep. 30, 2025

(54) WELDING METHOD AND ELECTRICAL DEVICE

(71) Applicant: HITACHI ASTEMO, LTD., Hitachinaka (JP)

(72) Inventors: Takahiro Mori, Ibaraki (JP); Shin Onose, Ibaraki (JP); Kenichi Nakayama, Ibaraki (JP); Yuta Chiba, Ibaraki (JP); Masaaki Suzuki, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 772 days.

(21) Appl. No.: 17/639,405

(22) PCT Filed: Aug. 11, 2020

(86) PCT No.: PCT/JP2020/030548
§ 371 (c)(1),
(2) Date: Mar. 1, 2022

(87) PCT Pub. No.: WO2021/044808
PCT Pub. Date: Mar. 11, 2021

(65) Prior Publication Data
US 2022/0305580 A1    Sep. 29, 2022

(30) Foreign Application Priority Data

Sep. 5, 2019    (JP) ................ 2019-162204

(51) Int. Cl.
    *B23K 9/235*    (2006.01)
    *B23K 9/00*    (2006.01)
    (Continued)

(52) U.S. Cl.
    CPC ............ *B23K 9/235* (2013.01); *B23K 9/0026* (2013.01); *B23K 9/167* (2013.01); *B23K 9/23* (2013.01);
    (Continued)

(58) Field of Classification Search
CPC ........ B23K 9/235; B23K 9/0026; B23K 9/23; B23K 9/167; B23K 2101/38; H02K 15/0421
See application file for complete search history.

(56) References Cited

U.S. PATENT DOCUMENTS 6,403,921 B1    6/2002   Maeda et al.
8,590,768 B2 *   11/2013   Sigler ................. B23K 20/021
                                          228/198

(Continued)

FOREIGN PATENT DOCUMENTS

CN         1068910 A     2/1993
CN        102756203 A    10/2012

(Continued)

OTHER PUBLICATIONS

International Search Report with English translation and Written Opinion issued in corresponding application No. PCT/JP2020/030548 dated Nov. 10, 2020.

(Continued)

*Primary Examiner* — Brian W Jennison
(74) *Attorney, Agent, or Firm* — Foley & Lardner LLP

(57) ABSTRACT

An object of the present invention is to suppress blow holes in welding using tough pitch copper.
A welding method includes a first step of heating at least a portion of a first conductor and a second conductor containing copper, and a second step of adding a filler metal containing phosphorus while melting the first conductor and the second conductor so that a phosphorus content rate in a welded portion at which an end portion of the first conductor and an end portion of the second conductor are connected to each other is equal to or more than 0.1%.

10 Claims, 9 Drawing Sheets

(51) Int. Cl.
*B23K 9/167* (2006.01)
*B23K 9/23* (2006.01)
*B23K 101/38* (2006.01)
*H02K 15/0421* (2025.01)

(52) U.S. Cl.
CPC ...... *H02K 15/0421* (2013.01); *B23K 2101/38* (2018.08)

(56) References Cited

U.S. PATENT DOCUMENTS

| | | |
|---|---|---|
| 2003/0021717 A1 | 1/2003 | Harris |
| 2011/0133581 A1 | 6/2011 | Ha |
| 2011/0168678 A1 | 7/2011 | Takeda et al. |
| 2012/0100390 A1 | 4/2012 | Kuroda et al. |
| 2012/0273557 A1* | 11/2012 | Perry ............... B23K 35/007 228/198 |
| 2015/0357724 A1 | 12/2015 | Okuno et al. |

FOREIGN PATENT DOCUMENTS

| | | |
|---|---|---|
| JP | H03-118976 A | 5/1991 |
| JP | 2000-350421 A | 12/2000 |
| JP | 2004-202521 A | 7/2004 |
| JP | 2011-120441 A | 6/2011 |
| JP | 2011-161514 A | 8/2011 |
| JP | 2012-087364 A | 5/2012 |
| JP | 2013-099755 A | 5/2013 |
| JP | 2014-087819 A | 5/2014 |
| JP | 2014-187031 A | 10/2014 |
| JP | 2015-131318 A | 7/2015 |

OTHER PUBLICATIONS

Office Action issued in corresponding Japanese Patent Application No. 2022-165494, with English Machine Translation dated Sep. 12, 2023 (8 pages).

Cai Renzhong (1979), "TIG Brazing of Armature Winding of Direct-Current Motor", Shanghai Motor Factory, pp. 95-99 with English Translation (16 pages).

Office Action issued in corresponding Chinese Patent Application No. 202080061872.2, dated Jan. 11, 2023 (8 pages).

* cited by examiner (a)        (b)

NORMAL-CURRENT WELDING CROSS-SECTION

PULSE-CURRENT WELDING CROSS-SECTION

WELDING METHOD AND ELECTRICAL DEVICE

TECHNICAL FIELD

The present invention relates to a welding method of welding a conductor and an electrical device including a welded portion.

BACKGROUND ART

Since an electrical device such as a rotating electrical machine and a power conversion device needs to cause a large current to flow with low resistance, a thick conductive wire and a copper plate are used, and are connected by bonding.

Background art of the present technical field includes the following prior art. PTL 1 (JP 2004-202521 A) discloses a welding method including: preheating a metal member as a repair target by energizing the metal member for a short time; spotting and tacking a welding material, in which at least a portion is melted, on the preheated metal member; completely melting the welding material tacked on the metal member by arc discharge; and welding a repaired portion of the metal member (see claim 1).

CITATION LIST

Patent Literature

PTL 1: JP 2004-202521 A

SUMMARY OF INVENTION

Technical Problem

For such a welded portion, oxygen-free copper having a low oxygen content with favorable melting bondability is used. Oxygen-free copper is high in cost, and thus it is desired to change the material to oxygenated copper (tough pitch copper) having low cost. However, in welding using oxygenated copper, many blow holes are formed in a welded portion, and there is a concern about insufficient strength due to a decrease in a connection cross-sectional area and about an increase in an electric resistance value. Therefore, in welding using tough pitch copper, suppression of blow holes has been an object.

Solution to Problem

A representative example of the invention disclosed in this application is as follows. That is, there is provided a welding method including: a first step of heating at least a portion of a first conductor and a second conductor containing copper; and a second step of adding a filler metal containing phosphorus while melting the first conductor and the second conductor so that a phosphorus content rate in a welded portion at which an end portion of the first conductor and an end portion of the second conductor are connected to each other is equal to or more than 0.1%.

Advantageous Effects of Invention

According to the present invention, it is possible to perform welding in which blow holes of tough pitch copper containing a large amount of oxygen or a copper material having an oxide film attached to a surface thereof is suppressed. Objects, configurations, and effects other than those described above will be clarified by the descriptions of the following embodiments.

DESCRIPTION OF EMBODIMENTS

Embodiments of the present invention will exemplify a welding method of a copper material of an electrical connection portion used in an electric motor (motor coil), an electric rotating device (inverter bus bar), and the like. The present invention can also be applied to other welding methods such as laser welding and electron beam welding in addition to arc welding described below.

Figure 1:
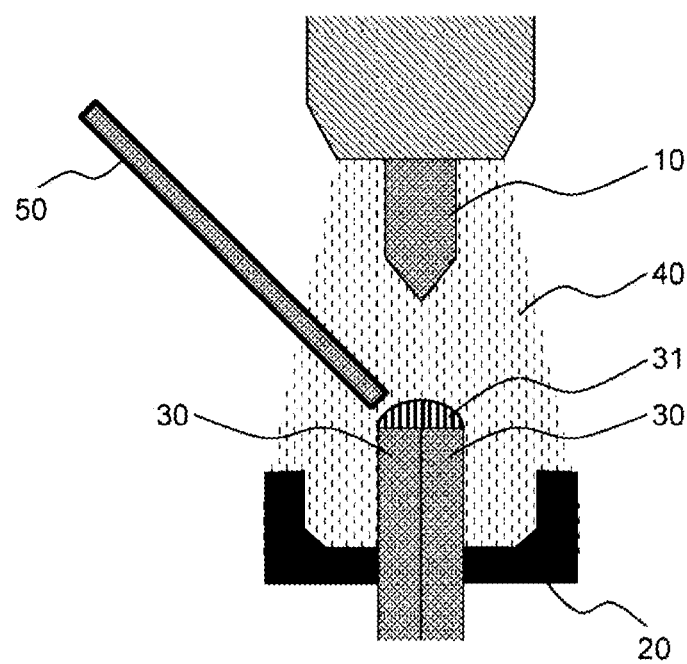
FIG. 1 is a diagram illustrating arc welding in an embodiment.

FIG. 1 is a diagram illustrating arc welding in an embodiment.

An arc welding machine includes an electrode 10 of a welding torch connected to a negative electrode, and a chuck 20 that is connected to a positive electrode and also serves as an electrode that clamps a copper material 30 to generate arc discharge between the chuck and the copper material 30. As described later, the copper material 30 as a welding target (workpiece) is a coil of a rotating electrical machine, terminals and bus bars of various control devices, or a plurality of conductors to be bonded. The electrode 10 may be formed of a tungsten material that is less consumed by welding.

In arc welding, as a first step, welding conditions (for example, the welding arc is reduced by a current corresponding to a distance between the electrode 10 and the copper material 30) suitable for the copper material 30 are selected, and a welding current is applied between the electrode 10 and the chuck 20.

A shielding gas 40 is blown to the welding arc to block the copper material 30 melted in welding from the atmosphere and protect the copper material 30 from oxidation. As the shielding gas 40, an inert gas (for example, an argon gas) is used.

As a second step, a filler metal 50 is added during welding. In the present embodiment, as the filler metal 50, a material in which an additive (deoxidizing agent) having a deoxidizing action is contained in the same metal material as a non-welded target may be used, and for example, a copper material (phosphorus-copper solder) containing phosphorus may be used.

Figure 3:
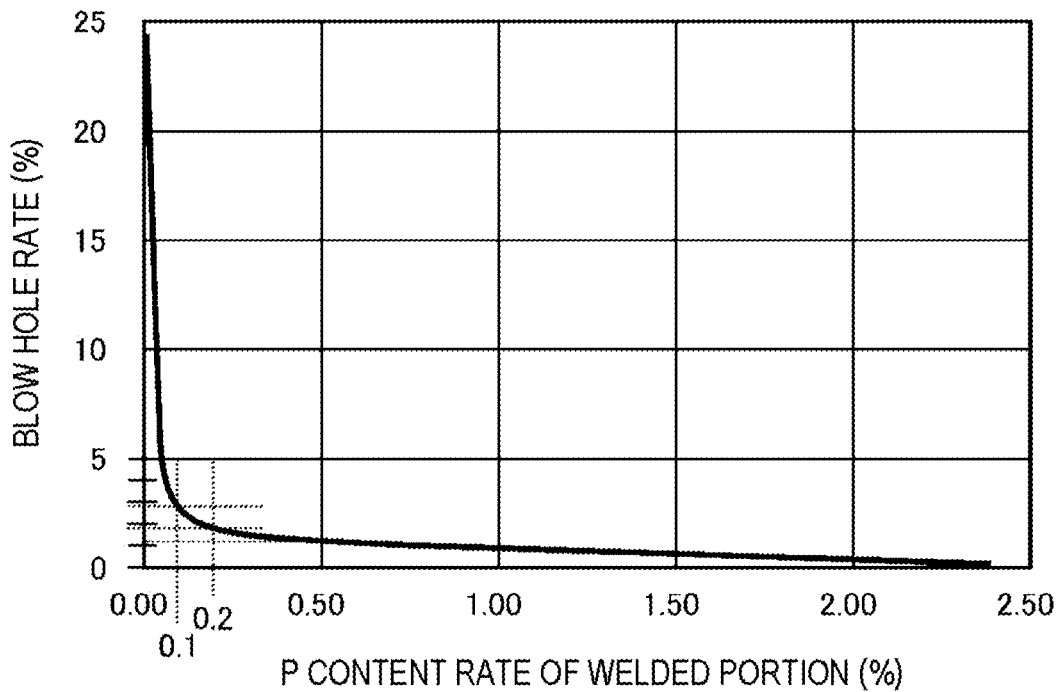
FIG. 3 is a graph showing a relationship between a phosphorus content rate and a blow hole rate in a welded portion.

In welding using oxygenated copper, a blow hole is formed in a welded portion 31. It is considered that, in the blow hole, oxygen contained in the material is mainly gasified, and the gasified oxygen remains in the welded portion 31 when copper is solidified. Thus, in the present embodiment, a copper material containing phosphorus is added as the filler metal 50, and oxygen and phosphorus contained in the copper material 30 are joined to form an oxide of phosphorus, and the amount of oxygen to be gasified is reduced, thereby suppressing blow holes due to the oxygen gas. In the present embodiment, the phosphorous-copper solder containing 5% to 7% phosphorus is used as the filler metal 50. In the present embodiment, since the phosphorus content rate of the welded portion 31 is equal to or more than 0.1% as illustrated in FIG. 3, the phosphorus-copper solder being the filler metal 50 may contain phosphorus of 0.1% or more. In addition, when a phosphorus-copper solder containing silver is used as the filler metal 50, it is possible to improve wettability. Furthermore, the filler metal 50 may be a copper material containing a deoxidizing agent such as silicon or manganese instead of the copper material containing phosphorus, and may be a copper material containing two or more of deoxidizing agents.

Then, the current is cut off, and the copper material 30 is removed from the chuck 20, thereby a welding operation is ended. Thus, it is possible to bond a plurality of copper materials 30 having low electric resistance and high strength.

According to the present embodiment, by adding the filler metal 50 having a deoxidizing action, it is possible to perform welding with suppressed blow holes even when oxygenated copper or a copper material with an oxide film attached to the surface is used.

Figure 2:
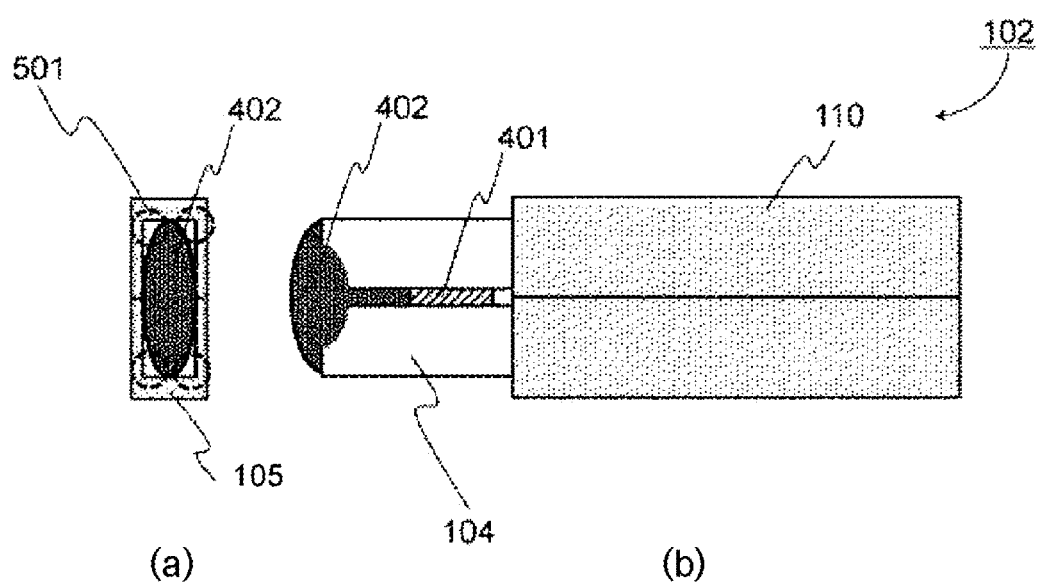
FIG. 2 is a diagram illustrating a bonding example of stator coil conductors welded by arc welding in the present embodiment.

FIG. 2 illustrates a bonding example of a welded stator coil conductor.

A copper material 401 containing phosphorus is interposed as the filler metal 50 between bonding target portions of stator coil conductors 102. A bonding portion 104 is melted so that the tip of the bonding portion becomes an alloy layer 402 of the stator coil conductor 102 and the bonding member 401, and the root portion of the bonding portion is electrically bonded as brazing of the bonding member 401. In the upper surface shape of the tip of the bonding portion, since the melting area of the bonding portion 104 is small, a portion of the end surface exists as a corner portion 501. Thus, it is possible to secure a distance from the adjacent bonding portion 104 and to improve insulation reliability.

As illustrated in FIG. 2(b), the cross-sectional shape after bonding has a feature in which a region (alloy layer) 402 where the tip of the bonding portion is an alloy of the stator coil conductor 102 and the bonding member 401 has a substantially T shape. By electrically bonding the alloy layer 402 having a substantially T-like cross-sectional shape and the root portion of the bonding portion as brazing of the joining member, it is possible to reduce the amount of heat applied to the bonding portion 104 as compared with the conventional bonding method using an arc.

By the above-described bonding method, it is possible to obtain effects that it is possible to reduce an insulating film peeling length for reducing the damage of an insulating film 105 on the outer periphery of the stator coil due to the heat in bonding while satisfying the joining strength, and it is possible to reduce a coil end height.

FIG. 3 is a graph showing a relationship between a phosphorus content rate and a blow hole rate in a welded portion 31.

The phosphorus content remaining in the welded portion 31 varies depending on the added amount of the filler metal during welding. Therefore, in a welding step, by adjusting the welding conditions (welding current, welding time, distance between non-welded target and electrode 10), the length of the copper material 30 to be melted at the tip (that is, the volume of the welded portion 31) is controlled and the added amount of the filler metal 50 is controlled to control the phosphorus content of the welded portion 31.

As can be seen from the graph, as the content rate of phosphorus being a deoxidizing agent increases, the blow hole rate in the welded portion 31 decreases. In particular, by setting the phosphorus content rate to be equal to or more than 0.1%, a large amount of oxygen contained in the copper material 30 is bonded to phosphorus, the amount of oxygen to be gasified is reduced, and the blow hole rate can be suppressed to be equal to or less than 20%. Preferably, the phosphorus content rate may be set to equal to or more than 0.2%, and the blow hole rate can be suppressed to be equal to or less than 2%. More preferably, the phosphorus content rate may be set to 1.0±0.5%, and the blow hole rate can be suppressed to be equal to or less than 1.5%.

The phosphorus content rate is determined by the ratio of the number of phosphorus atoms to the total number of atoms in the welded portion 31. In the present embodiment, the phosphorus content rate is measured by an inert gas fusion infrared absorption method, but the phosphorus content rate may be measured using a scanning electron microscope (SEM) or an electron probe microanalyzer (SPMA).

Figure 4:
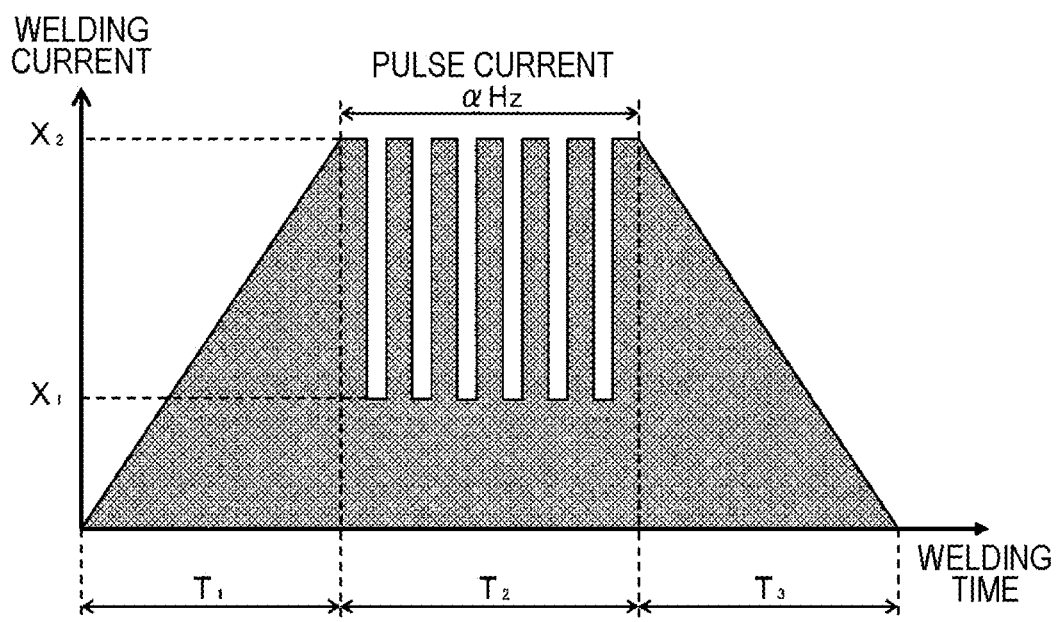
FIG. 4 is a diagram illustrating an example of a welding current.

FIG. 4 is a diagram illustrating an example of a welding current.

In the arc welding in the present embodiment, the welding current may be constant, but a current value changes with time, for example, a pulse current may be applied between the electrode 10 and the chuck 20. The molten metal of the welded portion 31 is agitated by the pulse current, and a so-called ball made of the molten metal moves up and down, so that the concentration of phosphorus in the welded portion 31 can be made uniform.

Figure 5A:
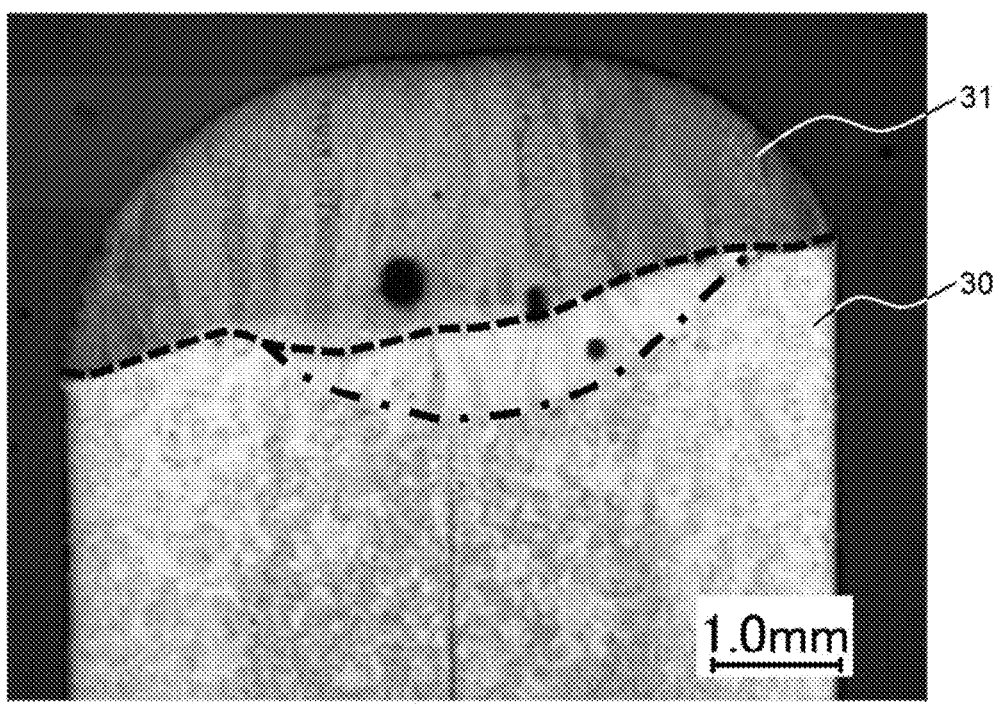
FIG. 5A is a cross-sectional picture of a welded portion of a copper material welded at a constant current.
Figure 5B:
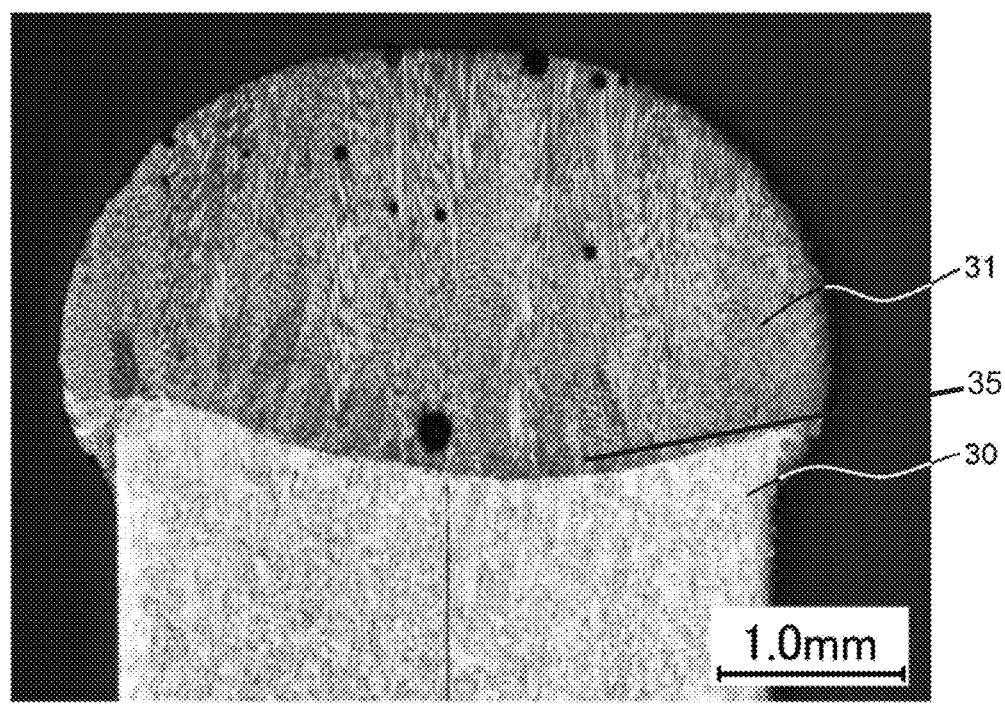
FIG. 5B is a cross-sectional picture of the welded portion of copper material welded by a pulse current.

FIG. 5A is a cross-sectional picture of the welded portion 31 of the copper material 30 welded with a constant current. FIG. 5B is a cross-sectional picture of the welded portion 31 of the copper material 30 welded with a pulse current.

As illustrated in FIG. 5A, a region having a high phosphorus concentration and a region having a low phosphorus concentration are formed in layers in the welded portion 31 welded at a constant current. In FIG. 5A, the upper broken line with a phosphorus concentration of 0.7% and the lower one-dot chain line with a phosphorus concentration of 0.1% are shown on the picture. Many blow holes may be formed in the vicinity of the boundary of the welded portion 31 (the lower boundary of the welded portion 31 indicated by the one-dot chain line) in the region where the phosphorus concentration is low, and the strength may decrease at the boundary of the welded portion 31.

On the other hand, as illustrated in FIG. 5B, a low phosphorus concentration region is not formed in the welded portion 31 welded by the pulse current. Therefore, the phosphorus concentration of the welded portion 31 is kept high up to the vicinity of the boundary, and many blow holes are not formed in the vicinity of the boundary, so that the strength of the boundary of the welded portion 31 is improved.

As described above, there is a difference in strength of the welded portion between a case of welding with a constant current and a case of welding with a pulse current. That is, the copper material 30 welded at a constant current is strong against breaking but weak against shearing. The breaking is a form of fracture in which a force that opens left and right is applied to the copper material 30 and cut at the welded portion 31. The shearing is a form of fracture in which a force that shifts in the longitudinal direction is applied to the copper material 30 and cut at the welded portion 31. As described above, since the copper material 30 welded at a constant current is strong against breaking, it is suitable for welding a coil of a rotating electrical machine in which a force for opening left and right is applied to the copper material 30. Since the copper material 30 welded at the pulse current is strong against shearing, it is suitable for welding a bus bar or the like of an inverter in which a force that shifts in the longitudinal direction is applied to the copper material 30.

In addition, as illustrated in FIGS. 5A and 5B, at the boundary between the copper material 30 and the welded portion 31, a recess portion 35 recessed from the other portion is formed in the vicinity of the boundary between two copper materials 30 (vicinity of the middle between the two copper materials 30). The reason why the vicinity of the middle of the copper material 30 is recessed as described above is that the melting point of copper is lowered by the addition of phosphorus, and thus the middle portion having a high phosphorus concentration is melted first. Generally, in welding such a wire rod, both sides having no heat escape place are melted first. As described above, in the arc welding method in the present embodiment, the copper material 30 is melted in the middle of a plurality of copper materials 30 to form a recess portion 35 as compared with the welding method in which the deoxidizing material is not added. Therefore, it is possible to increase the area of the boundary between the copper material 30 and the welded portion 31 and to suppress peeling of the copper material 30 from the welded portion 31.

Next, a rotating electrical machine and a power conversion device will be described as embodiments of an electrical device to which the above-described welding method is applied.

Figure 6:
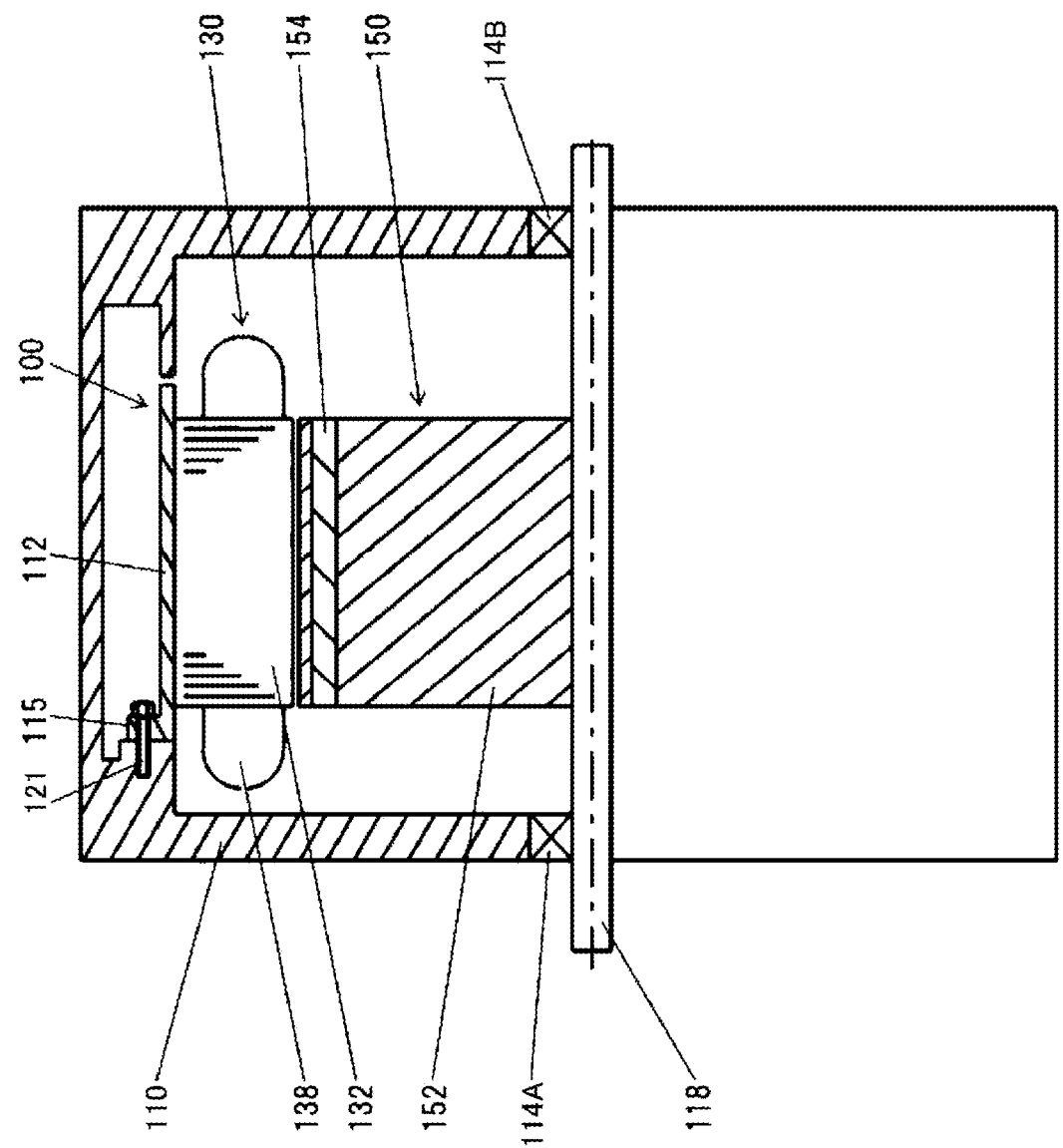
FIG. 6 is a schematic diagram illustrating an overall configuration of a rotating electrical machine in an embodiment of the present invention.

FIG. 6 is a schematic diagram illustrating an overall configuration of a rotating electrical machine 100 in an embodiment of the present invention.

The rotating electrical machine in the present embodiment is a rotating electrical machine suitable for use in traveling of an automobile. In the rotating electrical machine, segment coils are bonded at the adjacent end portions by the above-described welding method to form a stator coil 138 as an electrical circuit.

Here, a so-called electric vehicle using a rotating electrical machine includes a hybrid type electric vehicle (HEV) including both an engine and a rotating electrical machine and a pure electric vehicle (EV) that travels only with a rotating electrical machine without using an engine, but the rotating electrical machine described below can be used for both types. In the present embodiment, a three-phase synchronous motor will be described as an example of the rotating electrical machine 100, but the welding method of the present invention can also be applied to an induction motor.

FIG. 6 illustrates the inside of the rotating electrical machine 100 with a portion of the rotating electrical machine 100 as a cross section. The rotating electrical machine 100 is disposed inside a case 110 and includes a housing 112, a stator 130 having a stator core 132 fixed to the housing 112, and a rotor 150 rotatably disposed in the stator 130. The case 110 may be configured integrally with a case of the engine or a case of the transmission.

The rotating electrical machine 100 in the present embodiment operates as an electric motor that rotates a rotor 150 by supplying a three-phase AC current to a stator coil 138 wound around a stator core 132. When driven by an engine, the rotating electrical machine 100 operates as a generator and outputs generated power of the three-phase AC. That is, the rotating electrical machine 100 has both a function as an electric motor that generates rotational torque based on electric energy and a function as a generator that generates power based on mechanical energy, and the above-described functions can be selectively used depending on the traveling state of the automobile.

The stator 130 is fixed to the housing 112. The stator 130 is fixed and held in the case 110 by fastening a flange 115 provided in the housing 112 to the case 110 with a bolt 121. The rotor 150 fixed to a rotation shaft 118 is supported by bearings 114 A and 114 B of the case 110, and is rotatably held inside the stator core 132.

Figure 7:
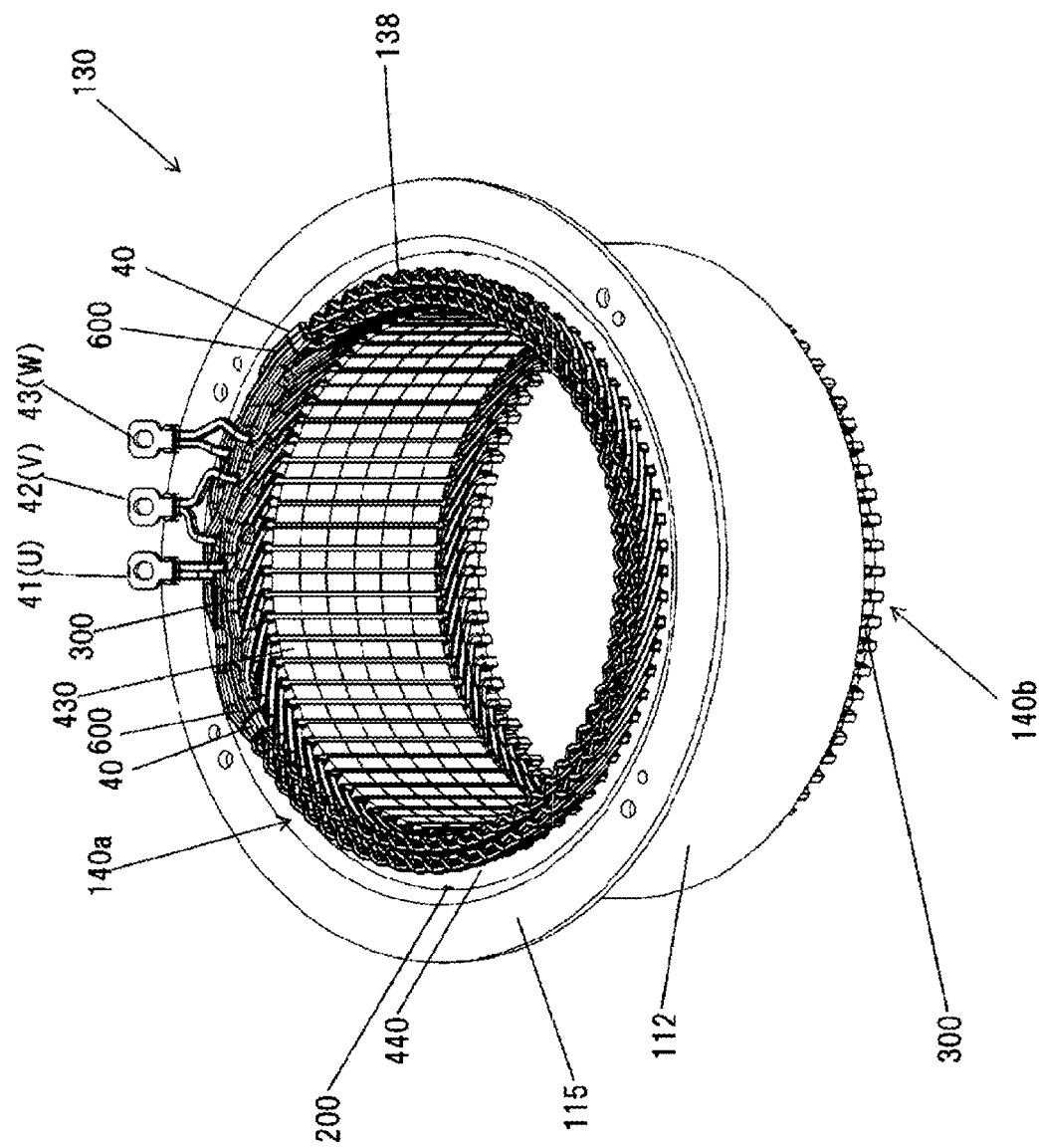
FIG. 7 is a perspective view illustrating a stator attached to a housing of the rotating electrical machine illustrated in FIG. 6.
Figure 8:
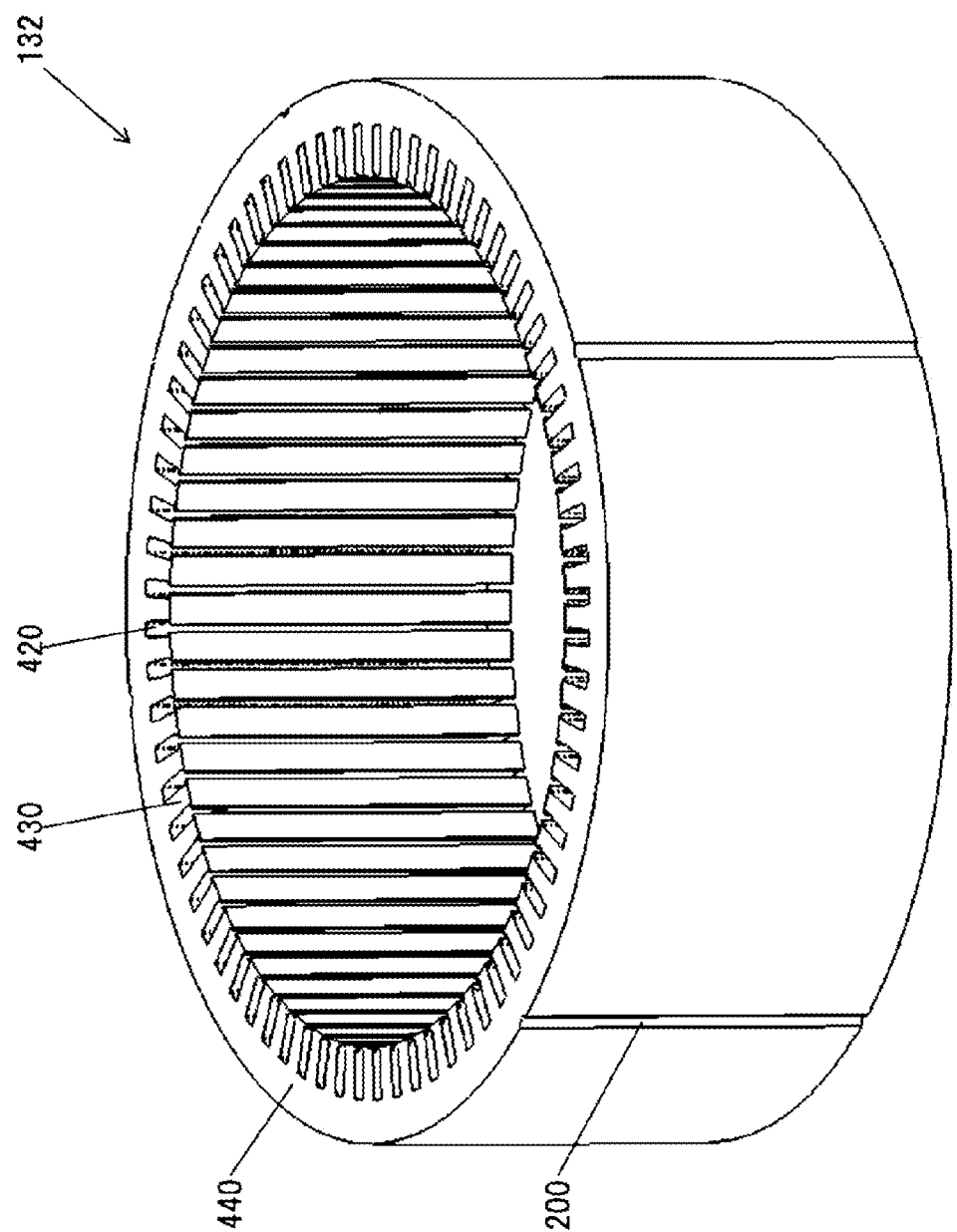
FIG. 8 is a perspective view of a stator core of the rotating electrical machine illustrated in FIG. 6.

FIG. 7 is a perspective view illustrating the stator 130 attached to the housing 112, and FIG. 8 is a perspective view of the stator core 132. The housing 112 is formed in a cylindrical shape by drawing a steel sheet (such as a high-tensile steel sheet) having a thickness of about 2 to 5 mm. The flange 115 is provided at one axial end of the housing 112, and is fixed to the case 110 with a bolt as described above (see FIG. 6). The flange 115 is formed integrally with the housing 112 by drawing. The stator 130 may be directly fixed to the case 110 without providing the housing 112.

The stator 130 is fixed to the inner peripheral side of the housing 112 and includes a cylindrical stator core 132 and a stator coil 138 attached to the stator core 132. The stator core 132 is formed by stacking a plurality of electromagnetic steel sheets 133 formed by punching or etching with a thickness of about 0.05 to 1.0 mm, for example. The stacked electromagnetic steel sheets 133 are connected and fixed by welding, and deformation of the electromagnetic steel sheets 133 due to fastening force when press-fitted into the housing 112 is suppressed.

In the stator core 132, a plurality of slots 420 extending in the axial direction is formed at equal intervals in the circumferential direction. The number of slots 420 is, for example, 72 in the present embodiment. As illustrated in FIG. 7, the stator coil 138 is accommodated in the slot 420. In the example illustrated in FIG. 8, the slot 420 is an open slot, and an opening is formed on the inner peripheral side of the stator core 132. The circumferential width of the opening may be substantially equal to or slightly smaller than the coil mounting portion of each slot 420 to which the stator coil 138 is mounted.

Insulating paper (so-called slot liner) 300 is disposed in each slot 420. The insulating paper 300 is, for example, an insulating sheet of heat-resistant polyamide paper, and has a thickness of about 0.1 to 0.5 mm. The insulating paper 300 is disposed in the slot 420 and coil ends 140a and 140b. By disposing the insulating paper 300 in the slot 420, the insulating paper is disposed between the coils inserted into the slot 420 and between the coil and the inner surface of the slot 420, and thus the withstand voltage between the coils and between the coil and the inner surface of the slot 420 is increased.

The stator coil 138 is formed by connecting a plurality of U-shaped segment coils 128 (not illustrated) to each other. The segment coil 128 is disposed so that one end portion thereof is adjacent to the other segment coil 128, so that the end portion thereof is exposed from the slot 420 (that is, the stator 130), and the other end portion thereof is further arranged adjacent to the other segment coil 128. The segment coils 128 having end portions that are adjacent to each other are bonded at the adjacent end portions by the above-described welding method to form the stator coil 138 wound around the stator core 132.

Teeth 430 are formed between the slots 420, and each tooth 430 is integrally molded with the annular core back 440. The stator core 132 is an integrated core in which the teeth 430 and the core back 440 are integrally molded. The teeth 430 guide the rotating magnetic field generated by the stator coil 138 to the rotor 150, and cause the rotor 150 to generate rotational torque.

The rotor 150 includes a rotor core 152 and a permanent magnet 154 held in a magnet insertion hole formed in the rotor core 152.

In the rotor core 152, rectangular parallelepiped magnet insertion holes are formed at equal intervals in the circumferential direction in the vicinity of the outer peripheral portion. A permanent magnet 154 is embedded in each magnet insertion hole and fixed with an adhesive or the like. A circumferential width of the magnet insertion hole is formed to be larger than a circumferential width of the permanent magnet 154, and a magnetic gap 156 is formed on both sides of the permanent magnet 154. The magnetic gap 156 may be filled with an adhesive or may be fixed integrally with the permanent magnet 154 with a resin.

The permanent magnet 154 forms a field magnetic pole of the rotor 150. In the present embodiment, one magnetic pole is formed by one permanent magnet 154, but one magnetic pole may be formed by a plurality of permanent magnets 154. By increasing the number of permanent magnets 154 for forming each magnetic pole, it is possible to increase the magnetic flux density of each magnetic pole generated by the permanent magnet 154 and to increase the magnet torque. As the permanent magnet 154, a neodymium-based or samarium-based sintered magnet, a ferrite magnet, a neodymium-based bonded magnet, or the like can be used. The residual magnetic flux density of the permanent magnet 154 is desirably about 0.4 to 1.3 T, and a neodymium-based magnet is more suitable. An auxiliary magnetic pole may be formed between the permanent magnets 154.

When the three-phase AC current is supplied to the stator coil 138 to generate a rotating magnetic field in the stator 130, the rotating magnetic field acts on the permanent magnet 154 of the rotor 150 to generate a magnet torque. Since the reluctance torque described above is generated in the rotor 150 in addition to the magnet torque, both the magnet torque and the reluctance torque described above act as the rotational torque in the rotor 150, and a large rotational torque can be obtained.

Figure 9:
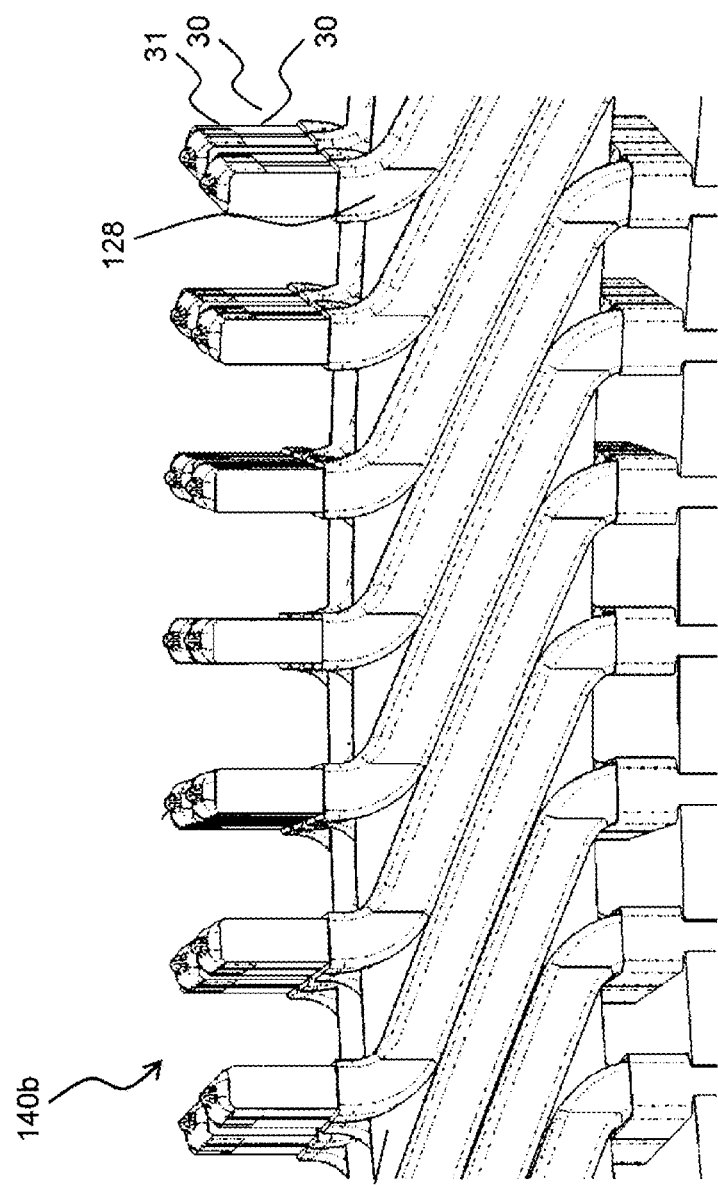
FIG. 9 is a perspective view of a coil end of a segment coil of the rotating electrical machine illustrated in FIG. 6 after welding.

FIG. 9 is a perspective view of the coil end 140b of the segment coil 128 after welding.

In the present embodiment, four segment coils 128 are disposed in each slot 420, and as illustrated in FIG. 9, end portions of two adjacent segment coils 128 are welded and connected to form the coil end 140b. For example, the copper material 30 constituting the segment coil 128 is melted by arc welding such as tungsten inert gas (TIG) welding, plasma welding, laser welding, or the like to form the welded portion 31, and connect the end portions of the segment coils 128.

Next, a power conversion device exemplified as an electrical device will be described.

Figure 10:
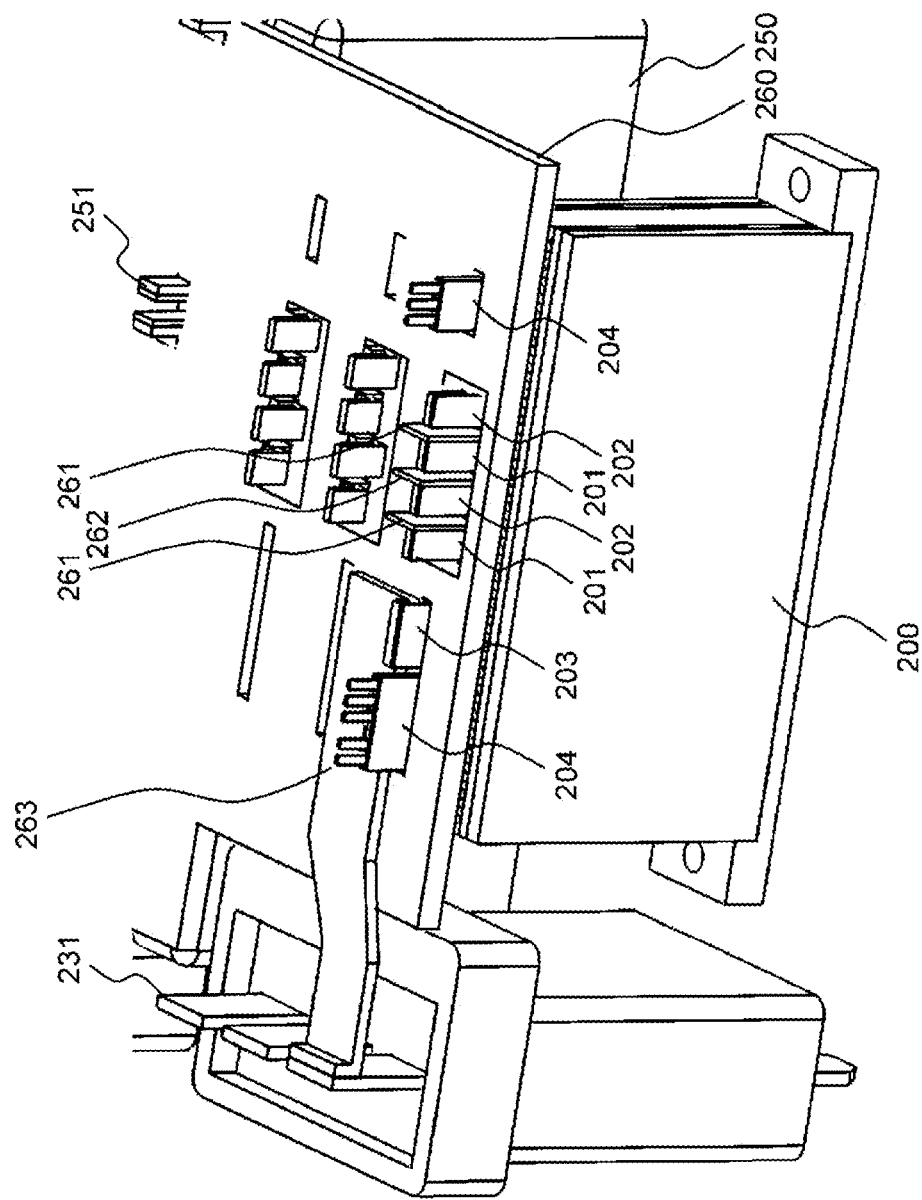
FIG. 10 is a perspective view illustrating a configuration of a power conversion device according to an embodiment of the present invention.
Figure 11:
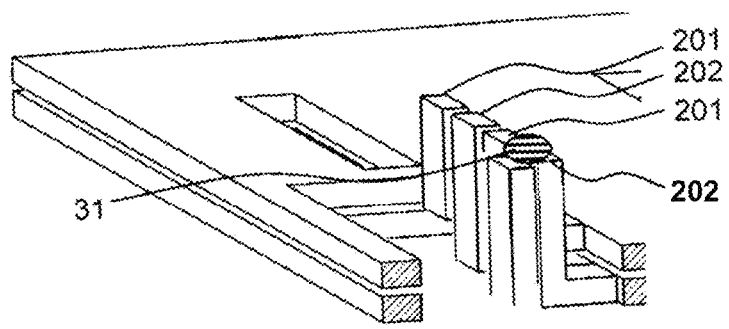
FIG. 11 is a diagram illustrating a welded portion between a terminal of the power conversion device and a terminal of a relay connection member illustrated in FIG. 10.

FIG. 10 is a perspective view illustrating a configuration of a power conversion device according to the embodiment of the present invention. FIG. 11 is a diagram illustrating a welded portion between a terminal of the power conversion device and a terminal of a relay connection member 260.

The power conversion device in the embodiment of the present invention is suitable for, for example, a hybrid vehicle or an electric vehicle, but the application thereof is not limited thereto. The terminal of the power conversion device is bonded to a bus bar by the welding method described above, and an electrical circuit in the power conversion device is connected to an external device.

The power conversion device is housed in a box-shaped housing (not illustrated) made of metal such as aluminum, and includes a plurality of power semiconductor modules 200 constituting an inverter circuit and a plurality of capacitor modules 250.

A terminal 251 is provided on the upper surface of the capacitor module 250.

The power semiconductor module 200 includes an upper arm circuit and a lower arm circuit configured by a switching element such as an insulated gate bipolar transistor (IGBT). The three power semiconductor modules 200 are connected to form a three-phase bridge circuit. By connecting the power semiconductor modules 200 in parallel corresponding to the respective phases of the three-phase inverter circuit, it is possible to increase power capable of coping with a large current.

A DC positive terminal 201, a DC negative terminal 202, an AC terminal 203, and connection terminals 204 such as a plurality of external signal terminals are provided on the upper surface of the power semiconductor module 200.

The relay connection member 260 is provided on the power conversion device. The relay connection member 260 may be fixed to the housing by a fastening member such as a screw. In the relay connection member 260, a positive-side DC bus bar 261 and a negative-side DC bus bar 262 are formed integrally with a resin body by insert molding. One end of the positive-side DC bus bar 261 and one end of the negative-side DC bus bar 262 are connected to a positive electrode and a negative electrode of a DC power supply (not illustrated), respectively. Furthermore, the relay connection member 260 is provided with an AC bus bar 263, and connects the AC terminal 203 of the power semiconductor module 200 and the AC terminal 231 connected to the rotating electrical machine.

As illustrated in FIG. 11, the terminals of the power semiconductor module 200 and the bus bars are bonded to each other by the welding method described above, and the welded portions 31 are formed at the end portions of the two conductors.

As described above, the embodiment of the present invention includes a first step of heating at least a portion of a first conductor and a second conductor (two copper materials 30) containing copper, and a second step of adding a filler metal 50 containing phosphorus while melting the first conductor and the second conductor so that the phosphorus content rate of the welded portion 31 connecting the end portion of the first conductor and the end portion of the second conductor is equal to or more than 0.1%. Thus, it is possible to perform welding while suppressing the tough pitch copper containing a large amount of oxygen and the blow holes of the copper material having an oxide film attached to the surface. In addition, by using tough pitch copper that is less expensive than oxygen-free copper, it is possible to reduce the cost of the electrical device. Furthermore, since tough pitch copper requires less power for manufacturing, it is possible to provide an electrical device with a low environmental load.

In the second step, since the filler metal 50 containing phosphorus is added so that the phosphorus content rate in the welded portion 31 is equal to or more than 0.2%, it is possible to suppress the blow hole rate to be equal to or less than 2%.

In the second step, since the filler metal 50 containing phosphorus is added so that the phosphorus content rate in the welded portion 31 is 0.5% to 1.5% (1.0±0.5%), it is possible to suppress the blow hole rate to be equal to or less than 1.5%.

In addition, in the first step, the first conductor and the second conductor are heated by arc discharge generated by a current flowing between the first conductor and the second conductor (copper material 30), and an electrode 10, and, in the second step, the filler metal 50 is agitated in the melted first conductor and second conductor by temporally changing the current value when the filler metal 50 is added. Thus, the concentration of phosphorus is uniform in the welded portion, and it is possible to suppress the formation of the blow hole in the region where the phosphorus concentration is thin.

In addition, in the first step, the first conductor and the second conductor are heated by arc discharge generated by a current flowing between the first conductor and the second conductor (copper material 30) and the electrode 10, and in the second step, when the filler metal 50 is added, the current value is made constant, so that the melted first conductor and second conductor are formed to have different phosphorus content rates. Thus, it is possible to improve the resistance against breaking due to a force that causes the copper material 30 to shift in the longitudinal direction and to impart toughness to the welded portion. During an operation of the rotating electrical machine, stress is generated in the welded portion of the stator coil due to vibration. In particular, the root portion of the bonding portion of the stator coil is likely to develop a crack due to tensile stress. When the toughness of the bonding portion is low, a crack may occur. In the present embodiment, since the root portion of the bonding portion has a portion having high toughness, cracks are hardly generated, and it is possible to improve the reliability of welding.

In addition, at the boundary between the first conductor and the second conductor, and the welded portion 31, a recess portion 35 in which the vicinity of a portion where the first conductor and the second conductor are in contact with each other is recessed from other portions is formed, and the phosphorus content rate in the welded portion 31 in the vicinity of the recess portion 35 is equal to or more than 0.1%. Thus, it is possible to increase the area of the boundary between the copper material 30 and the welded portion 31, and to suppress peeling of the copper material 30 from the welded portion 31.

The present invention is not limited to the above-described embodiments, and includes various modifications and equivalent configurations within the spirit of the appended claims. For example, the above embodiments are described in detail in order to explain the present invention in an easy-to-understand manner, and the present invention is not necessarily limited to a case including all the described configurations. In addition, a portion of the configuration of one embodiment may be replaced with the configuration of another embodiment. Further, the configuration of one embodiment may be added to the configuration of another embodiment. Regarding some components in the embodiments, other components may be added, deleted, and replaced.

REFERENCE SIGNS LIST

- 10 electrode
- 20 chuck
- 30 copper material
- 31 welded portion
- 40 shielding gas
- 50 filler metal
- 100 rotating electrical machine
- 121 bolt
- 110 case
- 112 housing
- 114A, 114B bearing
- 115 flange
- 118 rotation shaft
- 128 segment coil
- 130 stator
- 132 stator core
- 133 electromagnetic steel sheet
- 138 stator coil
- 140a, 140b coil end
- 150 rotor
- 152 rotor core
- 154 permanent magnet
- 156 magnetic gap
- 200 power semiconductor module
- 201 DC positive terminal
- 202 DC negative terminal
- 203 AC terminal
- 204 connection terminal
- 231 AC terminal
- 250 capacitor module
- 251 terminal
- 260 relay connection member
- 261 positive-side DC bus bar
- 262 negative-side DC bus bar
- 263 AC bus bar
- 300 insulating paper
- 420 slot
- 430 tooth
- 440 core back

The invention claimed is:

1. A welding method comprising:
   heating at least a portion of a first conductor containing copper and a second conductor containing copper; and
   adding a filler metal containing phosphorus while melting the first conductor and the second conductor so that a phosphorus content rate in a welded portion at which an end portion of the first conductor and an end portion of the second conductor are connected to each other is equal to or more than 0.1%;

wherein a recess portion in a vicinity of a portion at which the first conductor and the second conductor are in contact with each other and recessed from other portions is formed at a boundary between the first conductor and the second conductor, and the welded portion, and the phosphorus content rate in the welded portion in a vicinity of the recess portion is equal to or more than 0.1%.

2. The welding method according to claim 1, wherein the filler metal is added so that the phosphorus content rate in the welded portion is equal to or more than 0.2%.

3. The welding method according to claim 1, wherein the filler metal is added so that the phosphorus content rate in the welded portion is 0.5% to 1.5%.

4. The welding method according to claim 1, wherein the first conductor and the second conductor are heated by arc discharge generated by a current flowing between the first conductor and the second conductor, and an electrode, and when the filler metal is added, a current value of the current is temporally changed to agitate the filler metal in the melted first conductor and the melted second conductor.

5. The welding method according to claim 1, wherein the first conductor and the second conductor are heated by arc discharge generated by a current flowing between the first conductor and the second conductor, and an electrode, and when the filler metal is added, a current value of the current is made constant to perform formation so that the phosphorus content rates in the melted first conductor and the melted second conductor are different from each other.

6. An electrical device comprising:

at least one of a first conductor and a second conductor; and an electrical circuit connected to the at least one conductor, wherein the first conductor and the second conductor contain copper, an end portion of the first conductor and an end portion of the second conductor are connected via a welded portion, and a phosphorus content rate in the welded portion is equal to or more than 0.1%;

wherein a recess portion in a vicinity of a portion at which the first conductor and the second conductor are in contact with each other and recessed from other portions is formed at a boundary between the first conductor and the second conductor, and the welded portion, and the phosphorus content rate in the welded portion in a vicinity of the recess portion is equal to or more than 0.1%.

7. The electrical device according to claim 6, wherein the phosphorus content rate in the welded portion is equal to or more than 0.2%.

8. The electrical device according to claim 6, wherein the phosphorus content rate in the welded portion is 0.5% to 1.5%.

9. The electrical device according to claim 6, wherein a difference in phosphorus content rate between the welded portions is equal to or less than 7%.

10. The electrical device according to claim 6, wherein a region having a different phosphorus content rate in the welded portion is provided.

* * * * *